UNITED STATES PATENT OFFICE.

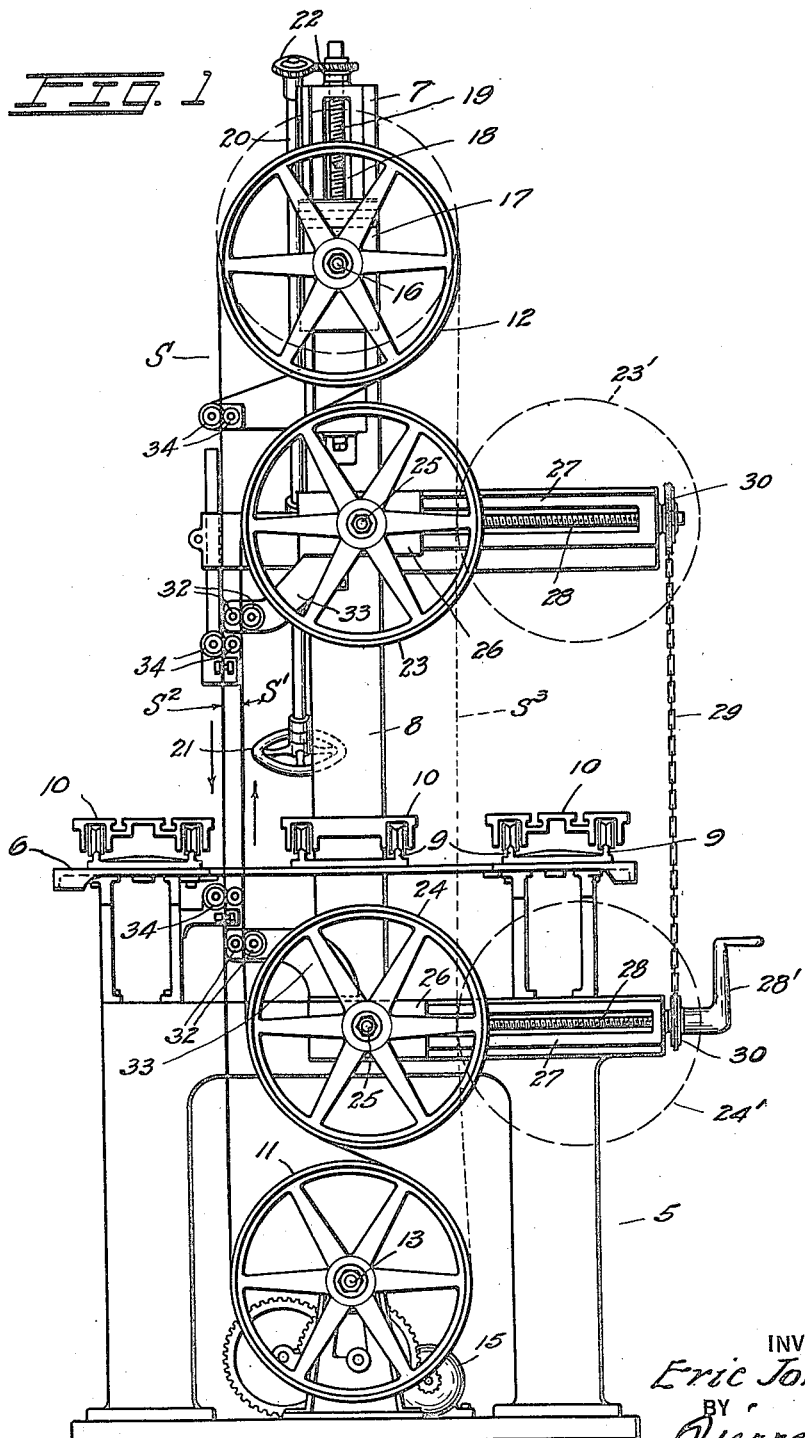

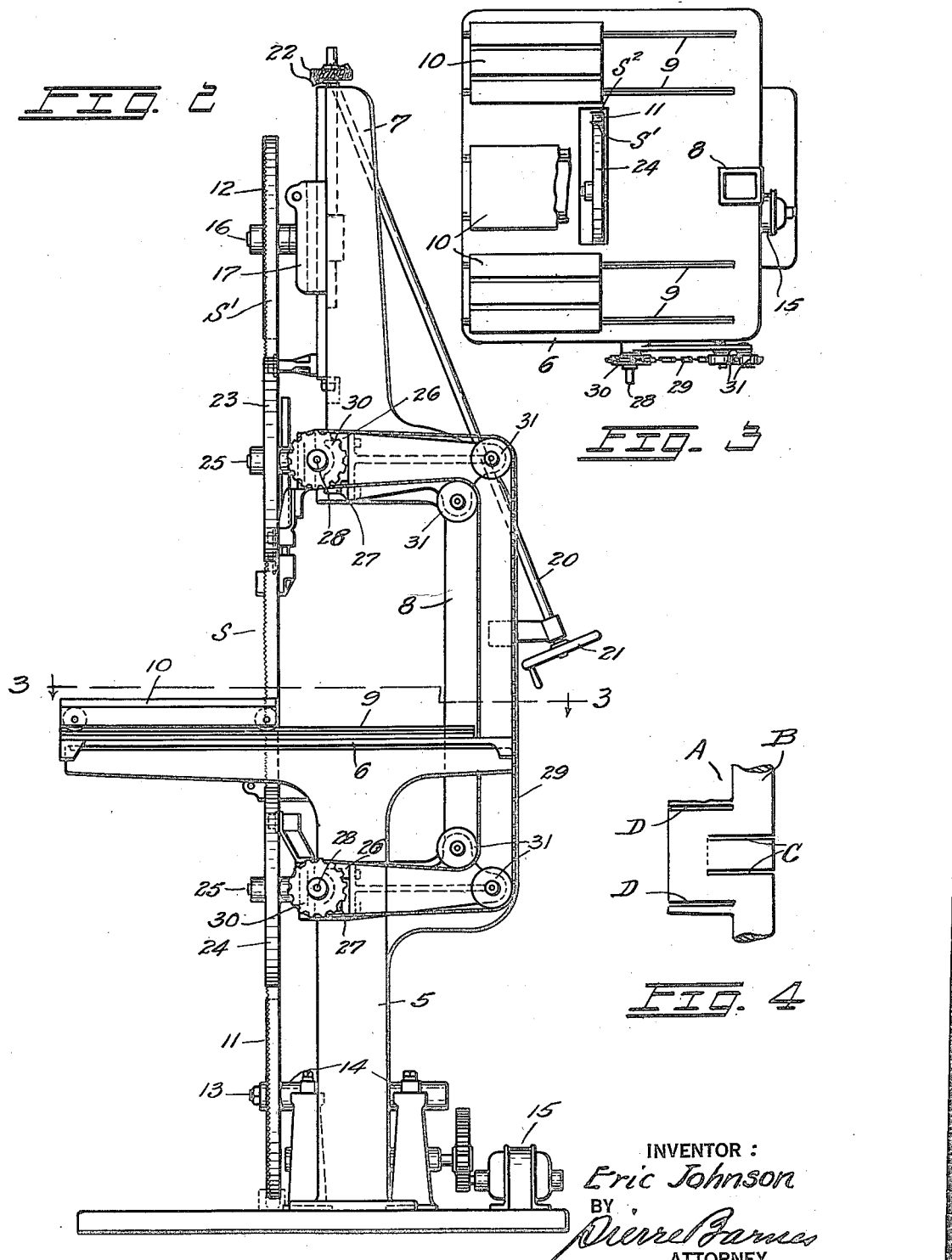

ERIC JOHNSON, OF SEATTLE, WASHINGTON.

BAND-SAW MACHINE.

1,416,355.  Specification of Letters Patent.  Patented May 16, 1922.

Application filed November 29, 1920. Serial No. 427,010.

*To all whom it may concern:*

Be it known that I, ERIC JOHNSON, a citizen of the United States, residing at Seattle, in the county of King and State of Washington, have invented certain new and useful Improvements in Band-Saw Machines, of which the following is a specification.

This invention relates to band-saw machines for use, more especially, in cutting metal.

The object of the invention is the provision of a machine of this class in which a single saw is utilized to produce two parallel cuts simultaneously at selected distances apart.

With these and other objects in view, the invention consists in the novel construction, adaptation and combination of parts as will be hereinafter described and claimed.

In the accompanying drawings, Figure 1 is a front elevation, and Fig. 2 is a side elevation of a machine embodying the present invention. Fig. 3 is a sectional view through 3—3 of Fig. 2. Fig. 4 is a plan view of an article to illustrate the character of work for which the machine is peculiarly adapted.

The frame of the machine may be of any preferred or suitable construction and, as illustrated, comprises a base member 5 supporting a table 6 and having an upper column member 7 which is connected by an offset portion 8 with said base member, as shown in Fig. 2. Provided upon said table are longitudinally disposed rail elements 9 which serve as tracks for carriages 10 upon which the work is supported and conveyed to the saw.

11 and 12 represent wheels disposed one above the other and about which a band saw S extends. The lower of these band-wheels, 11, is mounted upon a shaft 13 which is journaled in frame boxes 14 and is rotated to drive the saw by a motor 15 or other suitable power means.

The arbor 16 for the upper band wheel 12 is carried by a block 17 movable vertically upon ways 18 provided in the frame part 7. A screw 19 engaging the block 17 effects the vertical adjustment of the band wheel 12 and, as illustrated, said screw is operated through the medium of a regulating rod 20 having at one end a crank wheel 21 and is connected with said screw at its other end by means of toothed gears 22.

23 and 24 represent band guide pulleys for directing one of the band leads.

The arbors 25 for the respective guide pulleys are carried by blocks 26 which are guided for horizontal movements at elevations intermediate the band wheels 11 and 12 by means of ways 27 provided in the machine frame. Screws 28 engaging the respective blocks 26 are operatively connected with each other as by means of an endless chain 29 passing about guide sheaves 31 and engaging sprocket wheels 30 which are mounted upon the respective screws 28. Said chain is conveniently actuated through the instrumentality of a crank handle $28^1$ (Fig. 1) applied to one of the screws 28.

By thus connecting the screws they are caused to rotate coincidently to impart corresponding horizontal movements to the blocks 26 whereby the band guide pulleys 23 and 24 are shifted to one side or the other to locate the band lead $S^1$ at a desired distance from the complementary lead $S^2$.

Rollers 32 carried by bracket arms 33 of blocks 26 serve supplementary to the guide pulleys 23 and 24 to guide the band lead $S^1$.

In like manner rollers 34 act supplementary to the band wheels 11 and 12 to guide the lead $S^2$ of the band saw.

In operation one of the band leads travels upwardly and the other downwardly. By shifting the pulleys 23 and 24 toward or from the saw line of band lead $S^2$ the other band lead $S^1$ is correspondingly moved in vertical planes parallel to such saw line for varying the distance between the leads.

For thus adjusting the horizontal positions of said pulleys it is requisite that the elevation of the band wheel 12 be regulated to compensate for the amount of deflection imparted to band lead $S^1$ by lateral adjustments of the guide pulleys.

The operation of the invention will be readily understood from an inspection of Fig. 1. When said pulleys are located as indicated by full lines 23 and 24 the band lead $S^1$ will be relatively close to the lead $S^2$, but by retracting said pulleys for example to positions denoted by broken lines $23^1$ and $24^1$, the adjustable lead will occupy a sawing position more remote from the lead $S^2$ as indicated by broken line $S^3$ in the view.

A particular application of the invention is illustrated in Fig. 4 in which a forging A is to be machined to produce a crank for a shaft B. With the present invention the work A may be placed upon the carriages 10 and by advancing the same to the saw both of the cuts C may be performed in a single operation.

By turning the work over, the two cuts D may be similarly produced.

The operation and advantages of the invention will, it is thought, be understood from the foregoing.

What I claim, is,—

1. In a band-saw machine, the combination of a work table, a band-saw, wheels therefor, means for adjusting one of said wheels relative to the other horizontally movable means cooperating with said wheels whereby both leads of said saw are directed to travel in vertical parallel planes through the work table at various selected distances apart.

2. In a band-saw machine, the combination of a machine frame provided with a continuous work table, a band-saw, wheels therefor respectively disposed above and below said table, an adjusting means for one of said wheels pulleys respectively provided above and below said table means for simultaneously regulating both of said pulleys whereby one of the saw leads is caused to pass through the table in a plane parallel with and at selected distances from the plane of the other saw lead.

3. In a band-saw machine, the combination of a continuous band-saw, a pair of wheels therefor arranged to direct the saw in vertical parallel planes, one of said wheels being vertically adjustable, blocks arranged for horizontal movements in said frame, pulleys rotatably mounted upon the respective blocks, screws engaging said blocks, operative connections between said screws for imparting corresponding horizontal movements to said pulleys whereby the latter cooperate with said wheels to guide the saw leads in planes parallel with each other and at selected distances apart.

4. In a band-saw machine, the combination of a continuous band-saw, band wheels therefor, means associated with said wheels for guiding one of the band leads between said wheels in a plane substantially tangent to both of the wheels, horizontally adjustable pulleys engaging the other lead of said saw to deflect the same from a plane tangential to both of said wheels, means associated with said pulleys for guiding the second named lead so that the portion thereof extending between said pulleys will be maintained in a plane parallel with the plane of the first named lead.

5. In a band-saw machine, a band-saw, band wheels, a pair of pulleys adapted to operate tangentially against a saw lead between said wheels, guide rollers associated with respective pulleys, and mechanism for simultaneously moving said pulleys and rollers to locate said lead medially of the wheels at selected distances from and in a plane parallel with the other saw lead.

6. In a band saw machine, a band saw, band wheels around which said saw passes, means for adjusting one of the wheels, pulleys adapted to operate tangentially against a saw lead, means for guiding another saw lead so as to provide oppositely moving parallel saw leads, and mechanism for moving said pulleys to locate said saw leads at selected distances apart while in a plane parallel with one another.

7. In a band saw machine, the combination with band wheels, of a continuous band saw passing therearound, pulleys disposed intermediate said band wheels for engaging one lead of the saw to maintain the same in parallel relation with the other saw lead moving in an opposite direction, and means for adjusting said pulleys to vary the distance between the oppositely moving saw leads while maintaining them in parallel relation.

Signed at Seattle, Washington, this 19th day of November, 1920.

ERIC JOHNSON.

Witnesses:
M. L. HEFLIN,
MERRIT BARNES.